United States Patent [19]

Rumbaugh

[11] Patent Number: 4,646,460
[45] Date of Patent: Mar. 3, 1987

[54] FISHING ROD HANDLE ASSEMBLY
[75] Inventor: James T. Rumbaugh, Spirit Lake, Iowa
[73] Assignee: Berkley and Company, Inc., Spirit Lake, Iowa
[21] Appl. No.: 790,467
[22] Filed: Oct. 23, 1985
[51] Int. Cl.[4] ............................................. A01K 87/06
[52] U.S. Cl. ........................................ 43/22; 43/20; 43/23
[58] Field of Search ............................. 43/20, 22, 23

[56] References Cited

U.S. PATENT DOCUMENTS 3,410,016 11/1968 Arsenault .............................. 43/22
4,432,155 2/1984 Miller .................................... 43/22
4,485,580 12/1984 Ohmura ................................ 43/22
4,520,587 6/1985 Wallace ................................ 43/23

FOREIGN PATENT DOCUMENTS 2704369 2/1976 Fed. Rep. of Germany .......... 43/22

Primary Examiner—Kuang Y. Lin
Assistant Examiner—Karen Skillman
Attorney, Agent, or Firm—Faegre & Benson

[57] ABSTRACT

A fishing rod handle assembly wherein the rim of a molded foregrip engages the foot of a fishing reel to secure it to the rod handle. The rim is reinforced by inserting a reinforcing ring into a slot and securing it with a suitable adhesive.

3 Claims, 2 Drawing Figures

U.S. Patent  Mar. 3, 1987  4,646,460
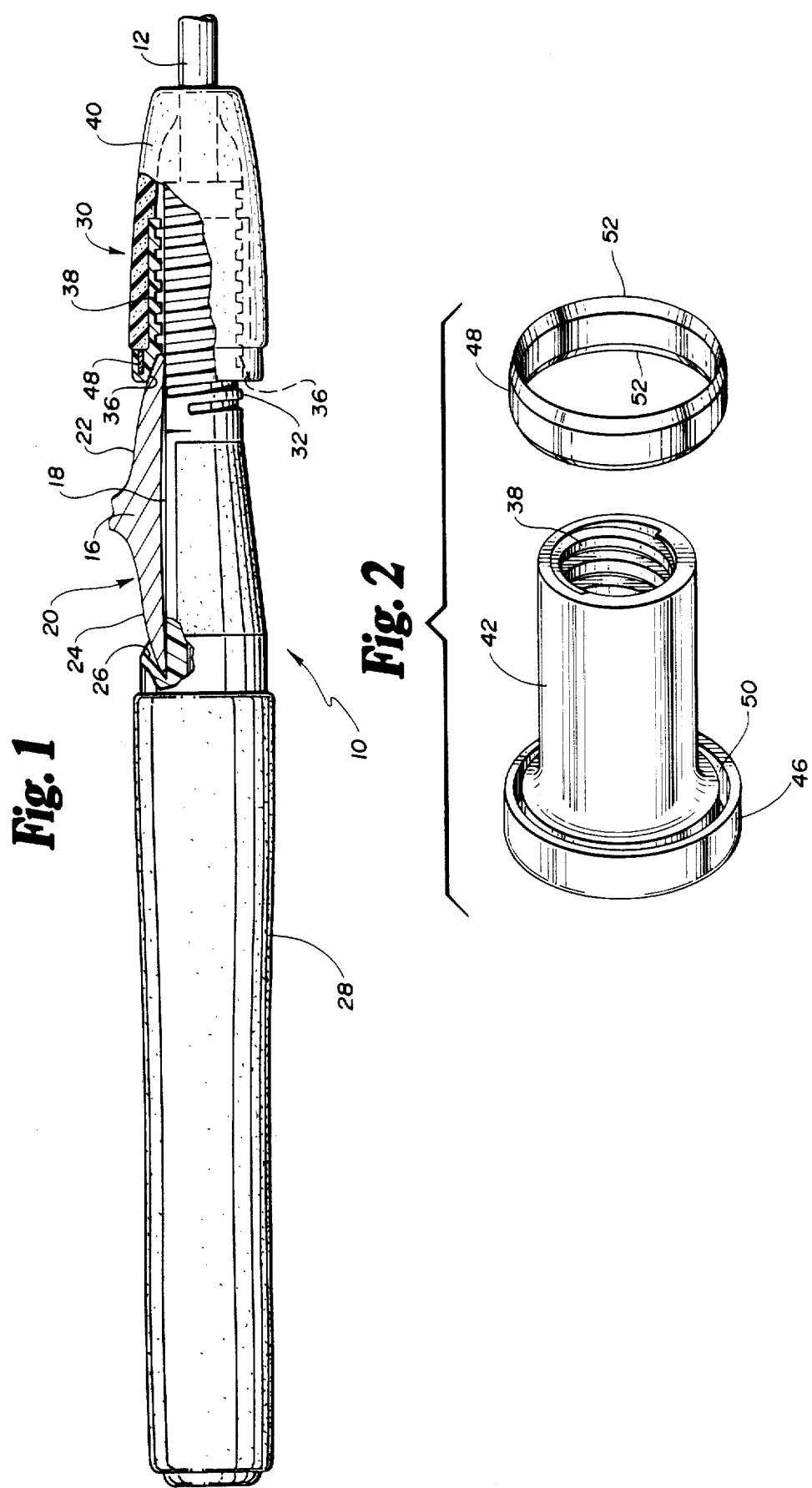

FISHING ROD HANDLE ASSEMBLY

BACKGROUND OF THE INVENTION

1. Field of the Invention

The present invention generally relates to a fishing rod handle assembly, and more particularly is concerned with an improved reel mounting structure.

2. Description of the Prior Art

Over the years, a wide variety of structures have evolved for mounting reels on fishing rods. The structures generally require a reel foot to be anchored at both ends to a reel receiving seat between the handle portion and the rod blank. Various structures are used to secure one end of the reel foot while releasibly securing the other end. In some handle assemblies, a threaded ring mounted on the foregrip portion of the handle assembly is movable to secure the reel foot. Such a structure is shown in U.S. Pat. No. 3,410,016. If the foregrip portions of those assemblies were cast from lightweight plastic, there is a possibility that the foregrip reel foot engaging structure could break in some situations.

It is also known to cast the threaded ring in a larger structure which can serve as the foregrip portion of the handle assembly while serving to anchor the forward projection of the reel foot in a conical space between the foregrip and the immovable portion of the rod handle. Such a structure is shown in co-pending design patent applications Ser. No. 773,782 and Ser. No. 773,783, both filed Sept. 9, 1985, and assigned to the assignee of the present application.

Stress is placed on the foregrip portion during use because the weight of the reel is forced against the edge of the foregrip portion. Because the reel receives various tugs, pulls and stresses as the fisherman casts and retrieves the line, those forces are transmitted through the reel handle and line to the reel foot and the conical distal edge of the rim of the threaded foregrip. Repeated and continuous use can weaken the molded foregrip rim, particularly when lightweight plastic materials are used. When the forces exceed the strength of the rim of the cone, the rim may split and crack, thereby destroying its effectiveness for securing the reel.

Consequently, a need exists for improvements in the molded foregrip portion of certain rod handle assemblies to produce a retaining foregrip which will resist stress and fatigue cracks and result in greater reliability and longer life.

SUMMARY OF THE INVENTION

The present invention provides an economical strengthened reel foot securing foregrip portion of a rod handle assembly. The improvement of the present invention may be incorporated into the design of any cone without interfering with the operation of the rod or reel.

Accordingly, the present invention provides a structure and method for providing a reinforced, molded reel foot securing foregrip. A strengthened ring is inserted into a grooved receptacle in the foregrip molding and is secured within the receptacle by a suitable adhesive.

BRIEF DESCRIPTION OF THE DRAWINGS

FIG. 1 is a side elevational view of a fishing rod handle showing a cutaway view of the improved rod handle assembly of the present invention.

FIG. 2 is a pictorial view of the essential elements of the reinforced foregrip portion of the fishing rod handle assembly.

DETAILED DESCRIPTION OF THE PREFERRED EMBODIMENTS

A rod handle assembly, generally designated 10, is shown in FIG. 1 with the butt end of a rod blank 12 secured at one end thereof. A reel foot 16 is positioned on the flattened surface 18 of the reel mounting area 20 of the rod handle assembly. The reel foot 16 has a forwardly projecting lobe 22 and a rearwardly projecting lobe 24. Rear lobe 24 is secured by a rear lip 26 which is integrally formed or molded into handle assembly 10 immediately forward of the handle grip 28.

In order to secure reel foot 16 and force it into supporting contact with surface 18, the foregrip portion, generally designated 30, is threadably engaged with external threads 32 which surround the circumference of the forward portion of handle assembly 10 between the reel mounting area 22 and its forward junction with rod blank 12. The portion of foregrip 30 adjacent the forward lobe 22 of reel foot 16 has a conical space 36 between foregrip 30 and flattened surface 18 which receives and allows foregrip 30 to secure the forward end of lobe 22 of reel foot 16 as foregrip 30 is advanced toward reel foot 16 by rotating it about the axis defined by rod blank 12 and by the action of rod handle threads 32 which cooperate with the inner threads 38 located on the interior walls of foregrip 30.

FIG. 2 shows, in exploded form, the internal structure of foregrip 30 with the protective and decorative outer sleeve 40 of EVA or foam rubber removed. A bobbin 42 is molded from a lightweight plastic material. The inner threads 38 cover its entire axial bore 44. At the proximal end of bobbin 42, which is adjacent the forward lobe 22 of reel foot 16, the threaded-interior lobe opens into a conical space beneath rim 46 which is thickened to provide additional strength for forcing forward projection or lobe 22 of reel foot 16 into secure contact with surface 18 of reel mounting area 20.

In prior art fishing rod handles, the means of securing the forward portion of the reel foot is generally a threaded metal ring of the type shown, for example, in Arsenault U.S. Pat. No. 3,410,016. In that type of structure, all of the exterior threads 60 on the rod handle assembly are generally exposed and may interfere with the comfort of the angler, as well as being subject to damage from external sources.

In the present invention, an enlarged molded foregrip portion 30 provides a protective and decorative covering to conceal substantially all of the external threading 32 of the forward portion of rod handle assembly 10.

For ease of manufacturing a lightweight and low cost handle assembly, it is particularly desirable to mold bobbin 42 from a suitable plastic, rather than metal, material. Unfortunately, such structures are subject to extremely high stresses, particularly in rim 46 above conical space 36 where foregrip 30 engages forward lobe 22 of reel foot 16.

In order to provide an acceptable plastic molded bobbin structure without having an unreasonably large plastic structure to provide sufficient strength, we have determined that a reinforced molded plastic structure can be provided which will provide superior strength characteristics without sacrificing the low weight of the foregrip portion and will allow the portion to be of a molded, lightweight and low cost construction.

In order to reinforce and strengthen the rim of molded bobbin 42 so that it can adequately secure the forward lobe 22 of reel foot 16 against the normal forces encountered in mounting a fishing reel, a reinforcing ring 48 is inserted into an annular groove in rim 46 of bobbin 42 to provide additional strength surrounding the conical opening 36 at the proximal end of foregrip portion 30.

Reinforcing ring 48 can be manufactured from any suitable high material, including high strength aluminum alloys and may be relatively thin while still providing substantial reinforcement to the bobbin. Reinforcing ring 48 is inserted in the reinforcing receiving groove 50 of bobbin 42 and can then be permanently secured using a suitable adhesive, such as an epoxy or other type of adhesive capable of bonding ring 48 to the walls of the reinforcing ring groove 50 of rim 46 of bobbin 42. The bonding provides a reinforced rim having more strength than either ring 48 or rim 46. Annular knife edges 52 may be provided on reinforcing ring 48 without detracting substantially from its strength and will provide for easier insertion of ring 48 into ring receiving groove 50 of rim 46.

It can be seen that the foregrip portion of the present invention provides a real improvement over the threaded metal rings, such as shown in prior art structures of the type depicted in the Arsenault patent. The present structure is lightweight and is protectively and ornamentally covered over most of its length by a foam rubber sheath 40 which provides protection to the external threading 32 of the handle assembly 10 and hides the connection of rod blank 12 to handle 10 to achieve a smoother, more attractive overall appearance. The foam rubber cover 40 for foregrip 30 can be selected to match the appearance of grip 28 used to cover the butt portion of handle 10. The provision of metal reinforcing ring 50 bonded to molded groove 50 of lightweight molded bobbin 42 results in an extremely strong structure for securing the forward lobe 22 of reel foot 16 without requiring the use of an expensive metal part which requires machining to provide the interior threads and a suitable exterior finish.

Although the present invention is described with reference to a preferred embodiment, it will be realized that workers skilled in the art will recognize changes which may be made in its form and detail without departing from the spirit and scope of the present invention. The method of strengthening the molded reel foot securing ring may have applicability to structures other than those shown in the preferred embodiment in this application. The steps of providing a circumferential groove in the rim of the threaded molded portion of the bobbin adjacent the proximal end thereof and insertion of a reinforcing band of high-strength material in the circumferential groove so that the band is entirely enclosed within the groove and the securing of the reinforcing band within the groove by bonding are method steps characteristic of our invention.

What is claimed is:

1. In an improved fishing rod handle assembly wherein the rim of a molded threaded bobbin portion is movable over a portion of a reel foot to secure it to the rod handle wherein an improved bobbin comprises:
   (a) reinforcing ring means;
   (b) an axially oriented annular groove provided in a portion of the rim of the bobbin projecting beyond the main body of the bobbin, the groove constructed and arranged for receiving and enclosing the entire reinforcing ring means; and
   (c) means for securing the ring means in the groove.

2. In an improved fishing rod handle assembly wherein the rim of a molded threaded bobbin portion is movable over a portion of a reel foot to secure it to the rod handle wherein an improved bobbin comprises:
   (a) reinforcing ring means having at least one annular knife edge for facilitating the insertion of the reinforcing ring into the receptacle means;
   (b) receptacle means provided in the rim of the bobbin and constructed and arranged for receiving the entire reinforcing ring means; and
   (c) means for securing the reinforcing ring means in the receptacle means.

3. The invention of claim 1 wherein the means for securing the ring in the receptacle means includes adhesive means placed in the receptacle means prior to insertion of the ring.

* * * * *